Patented Dec. 8, 1925.

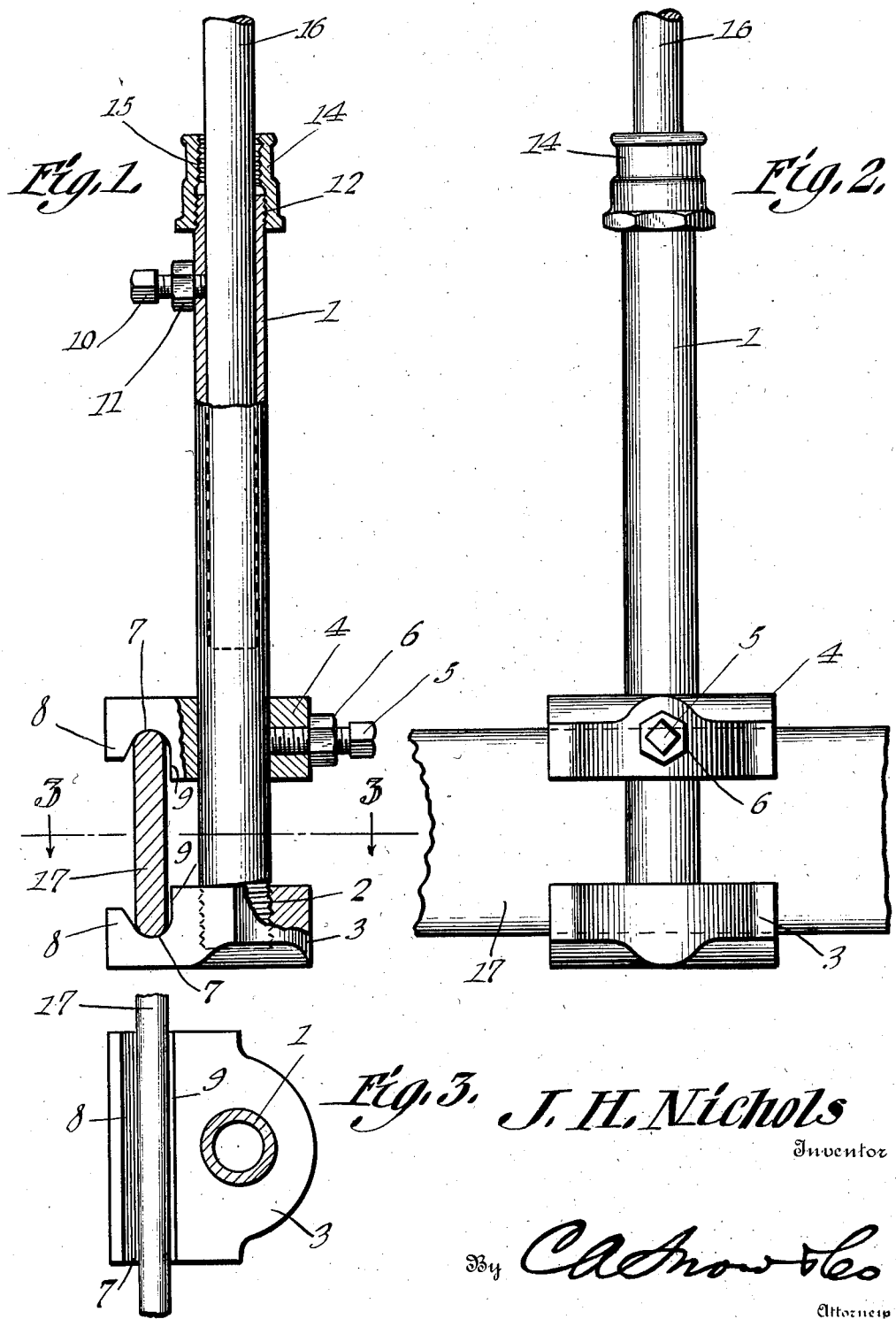

1,564,703

UNITED STATES PATENT OFFICE.

JOSEPH H. NICHOLS, OF HUNTINGTON, WEST VIRGINIA.

HOLDER.

Application filed November 10, 1924. Serial No. 748,905.

*To all whom it may concern:*

Be it known that I, JOSEPH H. NICHOLS, a citizen of the United States, residing at Huntington, in the county of Cabell and State of West Virginia, have invented a new and useful Holder, of which the following is a specification.

This invention aims to provide novel means whereby flags, ornaments, emblems, advertisements, signals, lamps or the like, may be held on the bumper of an automobile, and whereby, if desired, one end of a banner may be mounted on the rear bumper of a vehicle, the other end of the banner being mounted on the forward bumper of the vehicle.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown, can be made, without departing from the spirit of the invention.

In the accompanying drawings:—

Figure 1 shows in side elevation, a device constructed in accordance with the invention, parts being broken away;

Figure 2 is an elevation wherein the device is viewed at right angles to the showing of Figure 1; and Figure 3 is a transverse section on the line 3—3 of Figure 1.

In carrying out the invention, there is provided an elongated tubular socket 1, threaded at its lower end, as at 2, into a main jaw 3. An auxiliary jaw 4 is mounted for longitudinal rigid location on the socket 1 and may be held in adjusted positions, longitudinally of the socket, through the instrumentality of a set screw 5, threaded into the auxiliary jaw 4 and adapted to engage the socket 1, the screw 5 being held in place through the instrumentality of a lock nut 6. In the inner surfaces of the jaws 3 and 4, transverse seats or grooves 7 are formed, the seats or grooves being defined by outer flanges 8 and inner shoulders 9 in the jaws 3 and 4. A set screw 10 or other clamping device is mounted in the socket 1, near to the upper end thereof, and is held in place by a lock nut 11. At its upper end, the socket 1 is externally threaded as at 12, into a thimble 14, which is internally threaded at its upper or outer end, as shown at 15.

In practical operation, the bumper 17 of an automobile may be received in the seats 7 of the jaws 4 and 3, the jaw 4 being held in place by the set screw 5. It is to be observed that the shoulders 9 are longer than the flange 8. Consequently, the jaws 4 and 3 may be slid onto the bumper 17, until it abuts against the shoulders 9, and, then, the jaw 4 may be slid downwardly into the position shown in Figure 1, and be held in place by the set screw 5. Owing to the aforesaid relation existing between the flanges 8 and the shoulders 9, the mounting of the jaws 3 and 4 on the bumper 17 is facilitated.

A staff 16, adapted to support an article of any kind, may be inserted downwardly any desired distance to the socket 1 and be held in place by a set screw 10.

Let it be supposed that some object having a threaded hole is to be mounted on the socket 1. Then, the thimble 14 is removed, and the threads 12 may be engaged in the hole of the article or object. It may happen that some article which has an externally threaded part is to be retained. Then, the externally threaded part of the article is engaged with the threads 15 of the thimble 14 when the thimble is in place as delineated in Figure 1 of the drawings.

The device forming the subject matter of this application is simple in construction, and will be found thoroughly efficient for carrying out the objects set forth in the opening portion of the specification.

Having thus described the invention, what is claimed is:—

In a device for mounting a staff on an automobile bumper, a vertical staff-receiving socket of tubular form, a lower transverse jaw wherein the lower end of the socket is securely and fixedly mounted, the socket extending but part-way through the lower jaw and the lower end of the socket being closed by the lower jaw thereby to prevent a staff in the socket from sliding downwardly through the socket and coming into contact with the ground whilst the automobile is moving, a transverse upper jaw slidable upon the socket toward and away from the lower jaw, and means for holding the upper jaw releasably on the socket in adjusted positions longitudinally of the socket and with respect to the lower jaw, the jaws being provided with transverse seats for the reception of the upper and lower edges of an automobile bumper, the seats being formed by inner shoulders and outer flanges, the flanges being shorter than the shoulders, measured vertically, whereby the upper and lower edges of an automobile bumper may clear the flanges, strike the shoulders, and be lodged in the seats, when the flanges are separated by a vertical distance just sufficient to permit the bumper to pass between them.

In testimony that I claim the foregoing as my own, I have hereto affixed my signature.

JOSEPH H. NICHOLS.